Sept. 12, 1944.  W. O. POOL ET AL  2,358,030
PREPARATION OF AMINES
Filed June 10, 1941
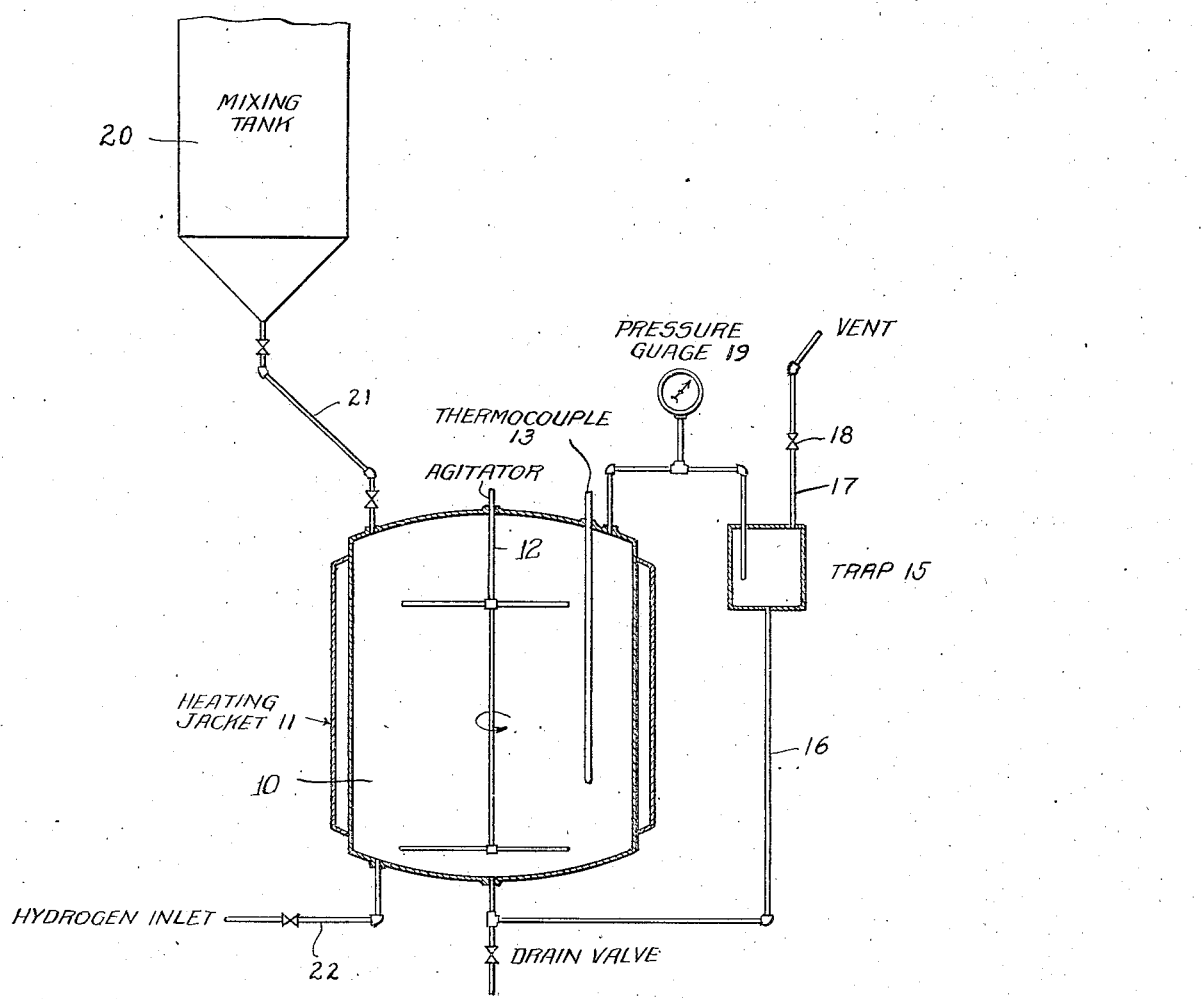
INVENTORS
Ralph H. Potts,
William O Pool
BY
Carl C. Batz atty.

Patented Sept. 12, 1944

2,358,030

UNITED STATES PATENT OFFICE 2,358,030

PREPARATION OF AMINES

William O. Pool, Chicago, and Ralph H. Potts, La Grange, Ill., assignors to Armour and Company, Chicago, Ill., a corporation of Illinois Application June 10, 1941, Serial No. 397,418

3 Claims. (Cl. 260—583)

This invention relates to the hydrogenation of aliphatic nitriles to produce the corresponding amines, and deals particularly with processes which are selective to the formation of secondary rather than primary amines.

The high molecular weight secondary amines are becoming of great commercial importance in many industrial fields, such as insecticides, the flotation of ores, and in many other commercial applications.

In the past there has been no satisfactory process known whereby secondary amines could be obtained directly from the corresponding nitriles, except in admixture with a major portion of primary amines. In the known processes for the hydrogenation of nitriles, invariably the product would be a mixture of primary, secondary and tertiary amines in which the primary amines were a very substantial constituent.

It is an important object of the invention to provide a process for treating nitriles with hydrogen which will yield a higher proportion of secondary amines. Another object is to provide such a process which is unfavorable to primary amines as an end product and which can be adjusted to yield secondary or secondary and tertiary amines in greater proportion. It is also desired that the reaction take place easily without the need for long holding periods.

We have discovered that secondary amines can be selectively produced by conducting the reaction of the nitriles with hydrogen in the presence of a special catalyst which is produced by reducing the salts of nickel or cobalt. We find that by using reduced nickel formate, for example, there is a very pronounced effect favorable to the formation of secondary amines. When such a catalyst is used the final amine product will contain a much greater amount of secondary and a much lesser amount of primary amines than could be obtained when using other catalysts, such as the Raney catalyst which is derived from an aluminum alloy of the nickel. The reasons for this special effect of reduced organic salt catalysts in the nitrile-hydrogen reaction is at present not well understood, and may better be dealt with after the following detailed description of the improved process.

One type of apparatus which may be used in practicing the invention is illustrated schematically in the accompanying drawing.

As shown, the apparatus includes a pressure tank 10 equipped with a heating jacket 11 which will receive a suitable heating fluid for maintaining the tank and its contents at a desired temperature. An agitator 12, which may be powered by an electric motor, or other suitable means, is provided for maintaining the tank contents under agitation during the treatment. A thermocouple designated 13 serves for indicating the temperature being maintained.

A line 14 leads from the top portion of tank 10 into a trap 15, and the line 16 leads from the trap back to the bottom of the tank. The line 17 provided with valve 18 leads from the upper portion of the trap to the atmosphere. A gauge 19 is provided to indicate the pressure being maintained in the system.

In carrying out the improved process using the illustrated apparatus, the nitrile is mixed with a suitable quantity of the special catalyst in the mixing tank 20 and the mixture discharged through the valve equipped line 21 into the reaction tank 10. If desired the mixing of the catalyst with the nitrile may be conducted in the tank 10 itself. The catalyst may be a reduced salt of either nickel or cobalt, preferably nickel. It may be the reduced aceate, formate, tartrate, oxalate, or other organic salt of such metals. Of these the reduced nickel formate makes a very superior catalyst.

With the mixture of nitrile and special catalyst in the tank 10 the heating fluid may then be admitted to the heating jacket and the agitator started. When the reaction temperature has been reached, hydrogen is admitted under pressure through line 22. Though the invention may be practiced at any temperature which will produce reaction, we prefer to use a temperature of between 160° C. as a lower limit and about 350° C., or as high as can be had without causing objectionable cracking, as the upper limit. We find that this range of temperatures is in the present process more favorable to the production of secondary and tertiary amines than are the ordinary temperatures below this range.

Hydrogen should be introduced in amounts and under pressure sufficient to replace the loss occasioned by venting or by being taken up in reaction so that there is a sufficient quantity present for further reaction.

During the treatment with hydrogen gas the resulting gases may escape through the line 14, and any entrained matter is caught in the trap 15 and so returned to the system. The valve 23 serves to regulate the quantity of gases which are permitted to pass off. It is preferable that the gases be thus vented during the reaction, it being understood that the desired pressure for reaction is to be maintained at the same time as venting takes place. It is also recognized that the invention may be practiced without reference to the venting feature, as with valve 23 closed during the reaction.

If desired, the hydrogen gas may be admitted to the tank 10 after reaction temperature has been obtained and during the time the reactants reach the preferred temperature.

The nitriles used in forming secondary amines according to the improved processes may be prepared, for example, by hydrolyzing oil, such as cottonseed oil, or soya bean oil, to produce glycerine and mixed fatty acids, and then reacting the fatty acids with ammonia to produce the nitriles. Advantageously the acids obtained upon hydrolysis may be fractionally distilled and a fraction having a desired boiling range recovered, this recovered fraction may then be subjected to reaction with ammonia to form nitriles in accordance with the method herein set forth. Suitably, the fatty acids themselves may be hydrogenated to form saturated fatty acids before reaction with ammonia, and the hydrogenated nitriles so formed then subjected to the hydrogenated treatment herein set forth to produce secondary amines. Any suitable method may be employed for producing the nitriles for use in this hydrogenation reaction.

The special catalysts employed in our invention may be prepared by reducing the metal salts with hydrogen gas. Suitably, the nickel or cobalt salts are suspended in an oil, such as cottonseed oil, and hydrogen passed to the mixture while maintaining a temperature of about 180 to 300° C. If nickel formate, for example, is the salt used, the resulting product of reduction contains free nickel, traces of nickel formate, also oxides and sub-oxides of nickel and minor quantities of other substances not now identified specifically. Likewise catalysts formed upon reduction of cobalt salts before mentioned contain free cobalt, the cobalt salt, cobalt oxides and sub-oxides and other unidentified substances. Instead of suspending the metal salt in oil, it may be suspended in nitriles, such as stearonitrile, or any other suitable medium to affect its reduction.

Instead of first reducing the metal salt to prepare the catalyst for use in the process, we can use the nickel or cobalt salt itself, mixing this with the nitrile, and treating the mixture with hydrogen to produce the secondary amine product. In some instances this procedure is preferable.

To illustrate the selective effect of the special catalyst in the formation of secondary amines, we include the following Examples I and II. Example I is illustrative of the results obtained according to the invention, using the reduced nickel formate catalyst, while Example II is illustrative of the results obtained under substantially identical conditions using the ordinary catalyst derived from nickel aluminum alloy.

Example I 114.3 g. of crude stearonitrile was hydrogenated using 0.2450 g. of catalyst containing 0.1143 g. of nickel prepared from nickel formate. The bomb was shaken at 220° C. for 90 minutes. The product consisted of:

|  | Per cent |
|---|---|
| Octadecylamine | 28.2 |
| Dioctadecylamine | 59.4 |
| Unchanged nitrile | 12.4 |

Example II 114.3 g. of distilled stearonitrile was hydrogenated using 0.1920 g. of catalyst containing 0.1143 g. of Raney nickel. The bomb was shaken at 220° C. for 100 minutes. The product consisted of:

|  | Per cent |
|---|---|
| Octadecylamine | 64.4 |
| Dioctadecylamine | 28.8 |
| Unchanged nitrile | 6.8 |

As seen by comparing the foregoing examples, the use of the reduced nickel formate catalyst produces a very marked selectivity favorable to secondary amines. A similar selectivity is obtained when using the reduced oxalate or acetate of nickel. The reduced nickel tartrate is also very effective in producing secondary amines, but due to quite incomplete reduction of the metal salt, the nitrile-hydrogen reaction takes place somewhat more slowly. The other reduced nickel salts are also selective to secondary amines. We have also found that substantially the same selectivity is obtained when the catalyst is prepared from a salt of cobalt.

While we do not wish to be bound by any theory which may be given in any attempt to explain the improved results obtained by the processes herein given, the following formulas may be helpful in explanation:

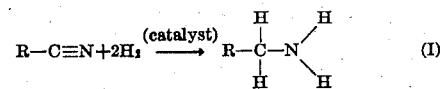

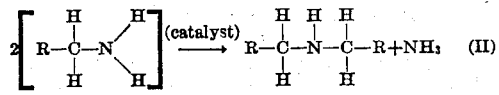

It is believed that the reaction to form secondary amines involves two steps, the first of which is represented by Equation I and the second of which is represented by Equation II. Equation I involves the union of the nitrile with hydrogen in which the result is a primary amine, and Equation II is the completion of the reaction where two molecules unite to produce a secondary amine with ammonia being released. In each of these equations R represents an aliphatic radical which in most instances will contain six or more carbon atoms. Another possibility is that the secondary and primary amines combine to form tertiary amines according to the following equation:

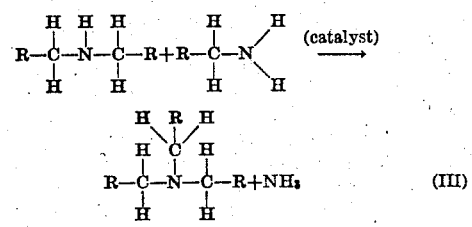

Assuming that the reactions taking place in the formation of secondary and tertiary amines follow the lines of Equations I, II, and III above given, it then appears that though the reaction of Equation I proceeds very well under the influence of the ordinary reduced nickel-aluminum catalyst, this catalyst may inhibit, or at least fail to promote the reaction component represented by Equations II and III, while on the other hand the reaction components of Equations II and III are effectively promoted under the influence of the reduced metal salt catalyst of the present invention.

The foregoing description and examples have been given for purposes of explanation only and no unnecessary limitation should be understood therefrom, it being understood that the improved process can be practiced in very different ways and with varied types of apparatus, all within the spirit of the invention.

We claim:

1. A process for the production of amines from aliphatic nitriles having at least 6 carbon atoms, comprising reducing a salt selected from the group consisting of nickel formate, nickel acetate, and nickel oxalate, while said salt is suspended in a liquid organic medium, to prepare a catalyst therefrom; and treating said nitriles with hydrogen under conditions of elevated temperature and pressure in the presence of said catalyst to produce an amine mixture having a high proportion of secondary amines.

2. A process as in claim 1 where said salt is nickel formate.

3. A process as in claim 1 where said salt is nickel acetate.

WILLIAM O. POOL.
RALPH H. POTTS.